(12) United States Patent
Lv et al.

(10) Patent No.: US 9,145,336 B2
(45) Date of Patent: Sep. 29, 2015

(54) SELF-REPAIRING COMPOSITES RESPONSIVE IN THE PRESENCE OF AN AQUEOUS MEDIUM

(75) Inventors: Ziyi Lv, Shanghai (CN); Xihui Zhou, Shanghai (CN); Xinjian Kou, Shanghai (CN); Jihong Huang, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/352,613

(22) PCT Filed: Nov. 14, 2011

(86) PCT No.: PCT/CN2011/082149
§ 371 (c)(1),
(2), (4) Date: Apr. 17, 2014

(87) PCT Pub. No.: WO2013/071472
PCT Pub. Date: May 23, 2013

(65) Prior Publication Data
US 2014/0290533 A1    Oct. 2, 2014

(51) Int. Cl.
B32B 5/16 (2006.01)
C04B 24/38 (2006.01)
C04B 22/00 (2006.01)
C04B 28/02 (2006.01)
C04B 20/10 (2006.01)

(52) U.S. Cl.
CPC .......... *C04B 24/383* (2013.01); *C04B 20/1007* (2013.01); *C04B 20/1033* (2013.01); *C04B 20/1048* (2013.01); *C04B 22/00* (2013.01); *C04B 28/02* (2013.01)

(58) Field of Classification Search
CPC .................................................. Y10T 428/2292
USPC .................................................. 428/403–407
See application file for complete search history.

(56) References Cited

U.S. PATENT DOCUMENTS

| | | | |
|---|---|---|---|
| 3,251,701 A | 5/1966 | Klein | |
| 3,963,507 A * | 6/1976 | Kuramoto et al. | 521/83 |
| 4,419,136 A | 12/1983 | Rice | |

(Continued)

FOREIGN PATENT DOCUMENTS

JP    2005207182    8/2005

OTHER PUBLICATIONS

Yang et al., Laboratory Assessment of a self-healing cementitious composite, Transportation Research Record: J. of the Transportation Research Board, No. 2142, Transportation Research board of the National Academies, DC, 2010, pp. 9-17 (DOI: 10.3141/2142-02).*
"Fast-Setting High Strength Concrete," Speed Crete, W.R. Meadows, accessed at http://www.wrmeadows.com/speed-crete-concrete-patching-compound/, accessed on Dec. 10, 2013, pp. 1-3.

(Continued)

*Primary Examiner* — Holly Le
(74) *Attorney, Agent, or Firm* — Knobbe Martens Olson & Bear LLp (57) ABSTRACT

Disclosed herein are composites capable of self-repairing. In some examples, the composites include a binding medium and a plurality of binding medium-repairing particles. The binding medium-repairing particles disclosed herein comprise a reactive agent encapsulated in a shell, where the reactive agent can interact with the binding medium to form an aggregate in the presence of an aqueous medium. Also disclosed herein are methods for making the composites and methods for making the binding medium-repairing particles.

24 Claims, 3 Drawing Sheets

(56) References Cited

U.S. PATENT DOCUMENTS

| | | | |
|---|---|---|---|
| 4,778,529 A * | 10/1988 | Barker et al. | 106/726 |
| 5,846,316 A | 12/1998 | Rice | |
| 7,670,426 B2 | 3/2010 | Gray | |
| 2007/0087198 A1* | 4/2007 | Dry | 428/408 |
| 2010/0308276 A1* | 12/2010 | Dry | 252/502 |
| 2011/0011303 A1* | 1/2011 | Jonkers | 106/15.05 |
| 2011/0054070 A1 | 3/2011 | Xing et al. | |
| 2011/0316189 A1* | 12/2011 | Pelletier et al. | 264/228 |

OTHER PUBLICATIONS

Ji, et al., "Preliminary study on water infiltration of concrete containing nano-$SiO_2$ and silicone," 8th International Congress on Civil Engineering, pp. 1-8, Shiraz University (2009).

Paul, et al., "Guide to Underwater Repair of Concrete," Reported by ACI Committee 546, pp. 1-93.

International Search Report and Written Opinion dated Aug. 30, 2012 for PCT Application No. PCT/CN2011/082149 filed Nov. 14, 2011.

* cited by examiner

SELF-REPAIRING COMPOSITES RESPONSIVE IN THE PRESENCE OF AN AQUEOUS MEDIUM

CROSS-REFERENCE TO RELATED APPLICATIONS

The present application is the U.S. National Phase filing under 35 U.S.C. §371 of International Application No. PCT/CN2011/082149 entitled SELF-REPAIRING COMPOSITES, filed Nov. 14, 2011. The content of this application is herein incorporated by reference in its entirety.

TECHNICAL FIELD

1. Field

The present disclosure relates generally to technologies for repairing cracks in concrete and enhancing concrete durability.

2. Background

Inspection and repair of cracks in concrete structures underwater can be challenging in the field of civil engineering and construction. Often times, by the time open cracks in the concrete structures are identified, the seawater has already infiltrated into the cracks and caused damage to the concrete structures. Various methods have been developed for repairing concrete cracks, which typically include covering the crack region(s) with a large block of concrete. For example, one approach is to use a template to cover all underwater crack regions and to fill in the gaps between the optional reinforcing steel bars. Another approach is to inject fluid concrete into the gap and maintain the concrete until the injected fluid concrete becomes hardened. However, the application of these methods is limited on concrete structures underwater because of their reliance on the prior detection of cracks.

SUMMARY

Some embodiments disclosed herein include a binding medium-repairing particle, comprising: a reactive material comprising a reactant; and a shell configured to at least partially encapsulate the reactive material, where the reactant is selected to interact with a binding medium to form an aggregate in the presence of an aqueous medium.

In some embodiments, the shell allows controlled-release of the reactive material in response to the aqueous medium. In some embodiments, the shell comprises acrylic or cellulose polymers, or any combination thereof. In some embodiments, the shell comprises a pore-forming agent. In some embodiments, the pore-forming agent is hydroxypropyl methyl cellulose (HPMC). In some embodiments, the shell comprises HPMC and ethylcellulose (EC). In some embodiments, the ratio of HPMC to EC is about 20:80 to about 90:10 by weight. In some embodiments, the ratio of HPMC to EC is about 50:50 to about 90:10 by weight.

In some embodiments, the reactant is selected from the group consisting of active silica, zeolite, diatomite, expanded perlite, or any combination thereof. In some embodiments, the reactant comprises active silica.

In some embodiments, the reactive material further comprises an expansion agent. In some embodiments, the expansion agent is expansive cement.

In some embodiments, the reactive material further comprises a disintegrant. In some embodiments, the disintegrant is selected from the group consisting of cross-linked carboxymethyl cellulose sodium, cross-linked polyvinylpyrrolidone, carboxymethyl starch sodium, metallic aluminum powder, or any combination thereof.

In some embodiments, the reactive material further comprises an adhesive material. In some embodiments, the adhesive material is a water-soluble agent. In some embodiments, the adhesive material is selected from the group consisting of lactose, syrup, honey, paste resin, lactose, sodium lauryl sulfate, microcrystalline cellulose, or any combination thereof. In some embodiments, the adhesive material is lactose.

In some embodiments, the amount of the reactant is about 70% to about 94% by weight, based on the total weight of the particle. In some embodiments, the amount of the expansion agent is about 1% to about 10% by weight, based on the total weight of the particle. In some embodiments, the amount of the disintegrant is about 2% to about 10% by weight, based on the total weight of the particle. In some embodiments, the amount of the adhesive material is about 1% to about 18% by weight, based on the total weight of the particle.

In some embodiments, the aqueous medium is seawater or freshwater. In some embodiments, the binding medium comprises cement.

Some embodiments disclosed herein include a self-repairing composite, comprising: a binding medium; and a plurality of particles, where at least one of the plurality of particles comprises a reactive material comprising a reactant and a shell configured to at least partially encapsulate the reactive material, where the reactant is selected to interact with the binding medium to form an aggregate in the presence of an aqueous medium.

In some embodiments, the reactive material further comprises an expansion agent. In some embodiments, the reactive material further comprises a disintegrant. In some embodiments, the reactive material further comprises an adhesive material.

In some embodiments, the relative ratio by weight of the plurality of particles and the binding medium in the composite is about 0.1:99.9 to about 10:90.

In some embodiments, the relative ratio by weight of the plurality of particles and the binding medium in the composite is about 1:99. In some embodiments, the binding medium comprises cement. In some embodiments, the cement is hydraulic cement.

In some embodiments, the average diameter of the plurality of particles is about 1 mm to about 5 mm. In some embodiments, the average diameter of the plurality of particles is about 2 mm to about 3 mm.

In some embodiments, the plurality of particles are dispersed within the binding medium. In some embodiments, the composite further comprises a granular material dispersed within the binding medium.

Some embodiments disclosed herein include a method for making binding medium-repairing particles, where the method comprises: providing a reactive material, wherein the reactive material comprises a reactant, wherein the reactant is selected to interact with a binding medium to form an aggregate in the presence of an aqueous medium; pelletizing the reactive material to form particles; and coating the particles with a shell to make the binding medium-repairing particles.

In some embodiments, the binding medium comprises cement. In some embodiments, the coating comprises drying the particles. In some embodiments, the particles are coated using a polymer atomization method or a fluidized-bed atomizing method.

Some embodiments disclosed herein include a method for making a self-repairing composite, where the method comprises: providing a reactive material, wherein the reactive material comprises a reactant, wherein the reactant is selected to interact with a binding medium to form an aggregate in the presence of an aqueous medium; pelletizing the reactive material to form a first plurality of particles; coating one or more of the first plurality of particles to form a second plurality of coated particles; mixing one or more of the second plurality of coated particles with the binding medium to form a mixture; and curing the mixture to form the self-repairing composite.

In some embodiments, the aqueous medium is seawater or freshwater. In some embodiments, the relative ratio by weight of the coated particles and the binding medium in the mixture is about 0.1:99.9 to about 10:90.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are composites, such as concrete, that exhibit the ability of self-repairing. As described herein, the self-repairing composites, in some embodiments, can include a binding medium, and one or more composite-repairing particles that include a shell and a reactive material that includes a reactant, where the reactant is selected to interact with the binding medium to form an aggregate in the presence of an aqueous medium, and the reactive material is encapsulated in the shell. In some embodiments, the composite-repairing particles are dispersed within the binding medium and the reactive material can be released from the shell under desired conditions (for example, the presence of an aqueous medium). In some embodiments, the reactive material becomes activated and interacts with the binding medium to form the aggregate upon contacting with the aqueous medium.

Also disclosed herein are methods for making the composites, the composite-repairing particles, and methods for making the composite-repairing particles.

Binding Medium-repairing Particles

Some embodiments disclosed herein provide binding medium-repairing particles. As used herein, the terms "binding medium-repairing particles" and "composite-repairing particles" are used interchangeably, and refer to particles that can repair the binding medium (e.g., concrete) within which the particles are embedded. In some embodiments, the binding medium-repairing particles include a reactive material that includes a reactant and a shell configured to at least partially encapsulate the reactive material, where the reactant is selected to interact with the binding medium to form an aggregate in the presence of an aqueous medium.

As disclosed herein, the reactive material can include a reactant and one or more additional components. The one or more additional component includes, but is not limited to, an expansion agent, a disintegrant, an adhesive material, or any combination thereof. In some embodiments, the reactive material includes a reactant and an expansion agent. In some embodiments, the reactant material includes a reactant, an expansion agent, and an adhesive material. In some embodiments, the reactive material includes a reactant, an expansion agent, an adhesive material, and a disintegrant.

Reactant

As used herein, the term "reactant" refers to any agent that can interact with one or more components of the binding medium to form an aggregate in the presence of an aqueous medium. The aqueous medium can be, but not limited to, seawater, saltwater, freshwater, or any medium that contains predominantly water. The formation of the aggregate by the reactant and the binding medium (e.g., concrete), in some embodiments, can repair a concrete or concrete-related structure within which the binding medium-repairing particle is embedded by blocking and/or sealing a crack area of the structure.

Examples of reactant include, but are not limited to active silica, zeolite, diatomite, expanded perlite, aluminum hydroxide nanoparticles, or any combination thereof. The aggregate can be in various forms, such as solid or gel. In some embodiments, the reactant includes active silica, for example, active silica particles. In some embodiments, the reactant can be active silica, aluminum hydroxide nanoparticles, or any combination thereof. In some embodiments, the reactant can be active silica nanoparticles, aluminum hydroxide nanoparticles, or any combination thereof.

The reactant can be in powder form (e.g., particles). For example, the reactant can be pulverized zeolite, pulverized diatomite, pulverized expanded perlite, or active silica nanoparticle. The size of the reactant particle can vary. For example, the average diameter of the particles can be about $10^{-6}$ m, about $10^{-7}$ m, about $10^{-8}$ m, about $10^{-9}$ m, or about $10^{-10}$ m, or a range between any two of these values. In some embodiments, the average diameter of the particles is about $10^{-6}$ m to about $10^{-9}$ m. In some embodiments, the average diameter of the particles is about $10^{-6}$ m to about $10^{-8}$ m. In some embodiments, the average diameter of the particles is about $10^{-9}$ m.

The amount of reactant in the binding medium-repairing particle can vary. For example, the amount of the reactant in the particle can be about 10%, about 20%, about 30%, about 40%, about 50%, about 60%, about 70%, about 75%, about 80%, about 85%, about 90%, about 95%, about 98%, about 99%, or any range between two of these values by weight, based on the total weight of the particle. In some embodiments, the amount of the reactant in the particle can be at least about 5%, at least about 10%, at least about 20%, at least about 30%, at least about 40%, at least about 50%, at least about 60%, at least about 70%, at least about 75%, at least about 80%, at least about 85%, at least about 90%, or at least about 95% by weight, based on the total weight of the particle. In some embodiments, the amount of the reactant in the particle is about 70% to about 94% by weight, based on the total weight of the particle.

Expansion Agent

In addition to the reactant, the reactive material disclosed herein may include an expansion agent. As used herein, the term "expansion agent" refers to any agent that can increase its volume upon being mixed with the aqueous medium. The volume increase of the expansion agent can enhance the blocking and/or sealing effect of the reactant. For example, the expansion agent can, in some embodiments, work with the reactant to block and/or seal the crack area of a concrete or concrete-related structure. For example, in some embodiments, the expansion agent increases in volume to fill up the crack when the binding medium-repairing particle is in contact with the aqueous medium.

Non-limiting examples of expansion agent include expansive cement, aluminum hydroxide nanoparticles, metallic aluminum powder, or any combination thereof. In some embodiments, the expansion agent is expansive cement. Expansive cement, also known as a modified Portland cement, is a Portland cement that includes an expansive material (e.g., hydraulic calcium silicates). Expansive cement, upon being mixed with water, can form a paste and increases in volume significantly more than the Portland cement paste. Various expansive cements are known in the art, for example those described in U.S. Pat. Nos. 3,251,701; 4,419,136; and 5,846,316. In some embodiments, the expansion agent is metallic aluminum powder. Without being limited to any particular theory, it is believed that metallic aluminum powder can produce gaseous hydrogen in an alkaline aqueous medium (e.g., alkaline water), and can thus enhance the blocking and/or sealing effect of the reactant. In some embodiments, the expansion agent is aluminous cement. Without being limited to any particular theory, it is believed that calcium aluminate in the aluminous cement can increase its volume considerably when it is in interact with gypsum, and thus enhance the blocking and/or sealing effect of the reactant.

The amount of expansion agent in the binding medium-repairing particle can vary. For example, the amount of the expansion agent in the particle can be about 0.5%, about 1%, about 2%, about 3%, about 4%, about 5%, about 6%, about 7%, about 8%, about 9%, about 10%, about 15%, about 20%, about 30%, about 40%, or about 50%, or any range between two of these values by weight, based on the total weight of the particle. In some embodiments, the amount of the expansion agent in the particle can be at least about 0.5%, at least about 1%, at least about 2%, at least about 3%, at least about 4%, at least about 5%, at least about 6%, at least about 7%, at least about 8%, at least about 9%, at least about 10%, at least about 20%, at least about 30%, at least about 40%, or at least about 50% by weight, based on the total weight of the particle. In some embodiments, the amount of the expansion agent in the particle is about 1% to about 10% by weight, based on the total weight of the particle.

Disintegrant

In addition to the reactant, the reactive material disclosed herein may include a disintegrant. As used herein, the term "disintegrant" refers to any agent that can cause the encapsulated reactive material to break apart in an aqueous medium and release the reactive material so that one or more components of the reactive material (e.g., the reactant) can interact with the binding medium to form an aggregate in the presence of the aqueous medium.

Examples of disintegrant include, but are not limited to, cross-linked polymers, such as cross-linked polyvinylpyrrolidone (crospovidone), cross-linked sodium carboxymethyl cellulose (croscarmellose sodium), and mixture thereof. Additional non-limiting examples of disintegrant include microcrystalline cellulose, starch, cornstarch, carboxymethylcellulose, calcium carboxymethylcellulose, sodium carboxymethyl starch, carmellose sodium, carmellose calcium, croscarmellose sodium, metallic aluminum powder, sodium starch glycolate, low-substituted hydroxypropylcellulose (L-HIPC), hydroxypropylstarch, and the like, or any combination thereof. In some embodiments, the disintegrant is selected from cross-linked carboxymethyl cellulose sodium, cross-linked polyvinylpyrrolidone, carboxymethyl starch sodium, metallic aluminum powder, or any combination thereof.

The amount of disintegrant in the binding medium-repairing particle can vary. For example, the amount of the disintegrant in the particle can be about 0.5%, about 1%, about 2%, about 3%, about 4%, about 5%, about 6%, about 7%, about 8%, about 9%, about 10%, about 15%, about 20%, about 30%, about 40%, or about 50%, or any range between two of these values by weight, based on the total weight of the particle. In some embodiments, the amount of the disintegrant in the particle can be at least about 0.5%, at least about 1%, at least about 2%, at least about 3%, at least about 4%, at least about 5%, at least about 6%, at least about 7%, at least about 8%, at least about 9%, at least about 10%, at least about 20%, at least about 30%, at least about 40%, or at least about 50% by weight, based on the total weight of the particle. In some embodiments, the amount of the disintegrant in the particle is about 2% to about 10% by weight, based on the total weight of the particle.

Adhesive Material

In addition to the reactant, the reactive material disclosed herein may include an adhesive material. As used herein, the term "adhesive material" refers to any material that provides sufficient adhesion between the various materials (e.g., the reactant, the expansion agent, and/or the disintegrant) in the reactive material. For example, the adhesive material may sufficiently adhere the various components in the reactive material to form a generally solid composite. In some embodiments, the adhesive material can allow the composite to flow.

In some embodiments, the adhesive material includes one or more water-soluble agents. For example, the adhesive material can be, but not limited to, syrup, honey, paste resin, lactose, sodium lauryl sulfate, microcrystalline cellulose, or any combination thereof. In some embodiments, the adhesive material includes lactose.

The amount of adhesive material in the binding medium-repairing particle can vary. For example, the amount of the adhesive material in the particle can be about 0.5%, about 1%, about 2%, about 3%, about 4%, about 5%, about 6%, about 7%, about 8%, about 9%, about 10%, about 15%, about 20%, about 30%, about 40%, or about 50%, or any range between two of these values by weight, based on the total weight of the particle. In some embodiments, the amount of the adhesive material in the particle can be at least about 0.5%, at least about 1%, at least about 2%, at least about 3%, at least about 4%, at least about 5%, at least about 6%, at least about 7%, at least about 8%, at least about 9%, at least about 10%, at least about 20%, at least about 30%, at least about 40%, or at least about 50% by weight, based on the total weight of the particle. In some embodiments, the amount of the adhesive material in the particle is about 1% to about 18% by weight, based on the total weight of the particle.

The relative ratio by weight between the reactant, the expansion agent, the disintegrant, and the adhesive material in the reactive material can vary. For example, the relative ratio can be: Reactant:Expansion agent:Disintegrant:Adhesive material=(65-100):(0-10):(0-10):(1-15). In some embodiments, the relative ratio can be: Reactant:Expansion agent:Disintegrant:Adhesive material=(65-94):(3-10):(2-10):(1-15). In some embodiments, the relative ratio is: Reactant:Expansion agent:Disintegrant:Adhesive material=(84-90):3:6:(1-7).

Shell

As disclosed herein, the binding medium-repairing particle may include a shell configured to at least partially encapsulate the reactive material. The shell can, in some embodiments, allow immediate, controlled, and/or sustained release of the reactive material encapsulated in the shell. In some embodiments, the shell allows controlled release of the reactive material encapsulated in the shell. For example, the shell can include one or more agents that are soluble in the aqueous medium in which the particles are present.

The dissolution of the shell, or a portion thereof, can lead to the exposure of the reactive material to the aqueous medium, for example via the release of the reactive material from the particle. Thus, it is possible to control the release of the reactive material based on the chemical composition or physical properties of the shell. As described above, the reactive material, for example the reactant, can become active and interact with the binding medium within which the binding medium-repairing particle is embedded to form an aggregate in the presence of the aqueous medium. In some embodiments, the thickness of the shell is correlated with the permeability of the shell. In some embodiments, the thickness of the shell is correlated with the time needed for the shell to dissolve to the extent that allows the reactive material to be exposed to the aqueous medium. In some embodiments, it takes at least about 1 minute, about 10 minutes, about 30 minutes, about 1 hour, about 5 hours, about 8 hours, about 10 hours, about 11 hours, about 12 hours, about 13 hours, about 14 hours, about 15 hours, about 16 hours, about 17 hours, about 18 hours, about 19 hours, about 20 hours, about 25 hours, about 30 hours, about 40 hours, or about 50 hours, or a range between any two of these values, or longer, for the shell to dissolve to the extent that allows the reactive material to be exposed to the aqueous medium and become active.

The time that is required for the shell to dissolve to the extent that allows the exposure of the reactive material to the aqueous medium can be determined using any standard method known in the art. For example, the time can be determined by immersing the binding medium-repairing particles in the aqueous medium, and detecting the concentration and/or amount of one or more components of the encapsulated reactive material (e.g., the reactant, the expansion agent, the disintegrant, and/or the adhesive material) in the aqueous medium over time. The presence of the component(s) of the encapsulated reactive material in the aqueous medium indicates that the shell has dissolved to the extent that allows the exposure of the reactive material to the aqueous medium. The absence of the component(s) of the encapsulated reactive material in the aqueous medium indicates that the shell has not dissolved to the extent that allows the exposure of the reactive material to the aqueous medium. In some embodiments, the amount of the component(s) of the encapsulated reactive material in the aqueous medium is positively correlated with the extent in which the shell has dissolved.

In some embodiments, the shell includes a water-soluble agent. Non-limiting examples of water-soluble agent include polyethylene glycol (PEG), propylene glycol, isopropyl alcohol, glycerol, lactose, glucose, sucrose, mannitol, sorbitol, sodium chloride, potassium chloride, hydroxypropyl cellulose, micronized sugar, hydroxypropyl methyl cellulose (HPMC), polyvinyl alcohols, methacrylic acid copolymers, ethylcellulose (EC), or any combination thereof.

In some embodiments, the shell includes a pore-forming agent. As used herein, the term "pore-forming agent" refers to any agent that is soluble in the aqueous medium and the dissolution of the pore-forming agent results in formation of one or more pores in the shell to allow release of the encapsulated reactive material. The pore-forming agent can be organic or inorganic, or any combination thereof. Examples of pore-forming agent include, but are not limited to, polyethylene glycol (PEG), propylene glycol, isopropyl alcohol, glycerol, lactose, glucose, sucrose, mannitol, sorbitol, sodium chloride, potassium chloride, hydroxypropyl cellulose, micronized sugar, hydroxypropyl methyl cellulose (HPMC), polyvinyl alcohols, methacrylic acid copolymers, or any combination thereof. In some embodiments, the pore-forming agent is HPMC. The shell can comprise various amount of pore-forming agent. For example, the shell can comprise the pore-forming agent in an amount of about 0.5%, about 1%, about 5%, about 10%, about 15%, about 20%, about 25%, about 30%, about 40%, about 50%, about 60%, about 70, about 80%, about 90%, about 95%, or about 99%, or a range between any two of these values, by the weight of the shell. In some embodiments, the shell can comprise the pore-forming agent in an amount of at least about 0.5%, at least about 1%, at least about 5%, at least about 10%, at least about 15%, at least about 20%, at least about 25%, at least about 30%, at least about 40%, at least about 50%, at least about 60%, at least about 70, at least about 80%, or at least about 90%, by the weight of the shell.

In some embodiments, the shell includes acrylic or cellulose polymers, or combination thereof. In some embodiments, the shell includes ethylcellulose (EC). In some embodiments, the shell includes HPMC and EC. The ratio between HPMC and EC can vary, for example, the ratio can be at least about 10:90, at least about 20:80, at least about 30:70, at least about 40:60, at least about 50:50, at least about 60:40, at least about 70:30, at least about 80:20, at least about 90:10, or at least about 95:5 by weight. In some embodiments, the ratio between HPMC and EC can be from about 20:80 to about 90:10, from about 30:70 to about 80:20, or from about 40:60 to about 70:30 by weight. In some embodiments, the ratio between HPMC and EC can be from about 50:50 to about 99:1, from about 60:40 to about 95:5, from about 70:30 to about 90:10, from about 75:25 to about 85:15 by weight. In some embodiments, the ratio between HPMC and EC is from about 20:80 to about 90:10 by weight. In some embodiments, the ratio between HPMC and EC is from about 50:50 to about 90:10 by weight.

Methods for Making Binding Medium-repairing Particles

Also disclosed herein are methods for making binding medium-repairing particles. The binding medium-repairing particles can, in some embodiments, be included in the self-repairing composites disclosed herein. Similarly, the methods for making binding medium-repairing particles can be included with the methods described below to form the self-repairing composites disclosed herein.

Figure 1:
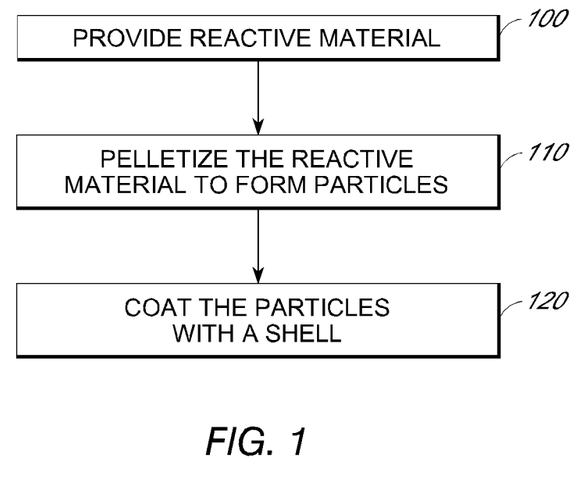
FIG. 1 depicts an illustrative embodiment of a method for making binding medium-repairing particles within the scope of the present disclosure.

Some embodiments of the methods disclosed herein are depicted in FIG. 1, which depicts an illustrative embodiment of a method for making binding medium-repairing particles within the scope of the present disclosure. Beginning at block 100 (Provide reactive material), a reactive material that includes a reactant is provided. The reactant can be any of those discussed above with respect to the binding medium-repairing particles. For example, the reactant can be active silica, zeolite, diatomite, expanded perlite, or any combination thereof. In some embodiments, the reactant is active silica. In addition to the reactant, the reactive material can also include one or more other components, such as expansion agent, disintegrant, adhesive material, or any other of the components described above with respect to the binding medium-repairing particles. In some embodiments, the reactant, the expansion agent, the disintegrant, the adhesive material, and/or any of the other component(s) included in the reactive material can be grinded (separately or together) before, during or after being combined to form the reactive material. As would be appreciated by the skilled artisans, various grinding mediums can be used during the grinding process as long as the grinding medium does not react with the reactant, and the expansion agent. In some embodiments, the reactant, the expansion agent, the disintegrant, the adhesive material, and/or any of the other component(s) included in the reactive material can be sieved (separately or together) before, during or after being combined to form the reactive material. Block 100 may be followed by block 110.

At block 110 (Pelletize the reactive material to form particles), the reactive material is pelletized to form particles. The reactive material can be pelletized using, for example, a pellet mill. The size of the particles is not limited in any way. For example, the average diameter of the particles can be about 0.1 mm, about 0.5 mm, about 1 mm, about 2 mm, about 3 mm, about 4 mm, about 5 mm, about 6 mm, about 7 mm, about 8 mm, or about 10 mm, or a range between any two of these values. In some embodiments, the reactant, the expansion agent and the disintegrant are mixed together, and adhesive material are then added to the mixture for pelletizing. In some embodiments, the particles can be further sorted according to their sizes. For example, the particles can be sieved and only particles of certain sizes are retained. In some embodiments, the particles with the diameter of about 1 mm to about 5 mm are retained. In some embodiments, the particles with the diameter of about 2 mm to about 3 mm are retained. Block 110 may be followed by block 120.

At block 120 (Coat the particles with a shell), the particles formed by the reactive material are coated with a shell to make the binding medium-repairing particles. The particles can be coated with the shell using any suitable methods known in the art. For example, the particles can be coated using a polymer atomization method or a fluidized-bed atomizing method. As described above, the shell is configured to at least partially encapsulate the reactive material. The shell may cover substantially all of the surface area of the particle formed by the reactive material, or only a portion. In some embodiments, the shell covers all of the surface area of the particle formed by the reactive material, and thus fully encapsulates the reactive material. All, or a portion, of the total particles formed by the reactive material may be coated with the shell. For example, about 10%, about 20%, about 30%, about 40%, about 50%, about 60%, about 70%, about 80%, about 90%, about 95%, or about 100%, or a range between any two of these values, of the particles formed by the reactive material may be coated with the shell. In some embodiments, about 10%, about 20%, about 30%, about 40%, about 50%, about 60%, about 70%, about 80%, about 90%, about 95%, or about 100%, or a range between any two of these values, of the particles have substantially all their surface areas covered by the shell. It will be appreciate by skilled artisans that the technique(s) in which the coating (block 120) is achieved is not limited in any way. In some embodiments, the coating includes spraying and/or drying (e.g., thermal current drying).

Figure 2A:
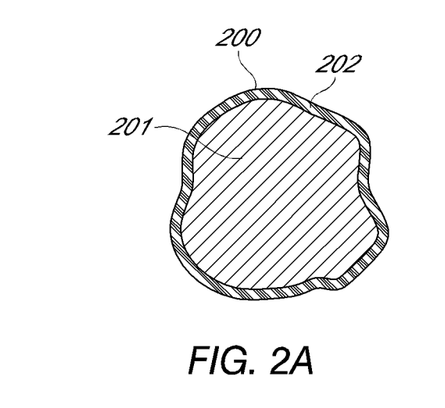
FIGS. 2A-B depict illustrative embodiments of a cross-sectional view of a binding medium-repairing particle that is within the scope of the present disclosure (not to scale).
Figure 2B:
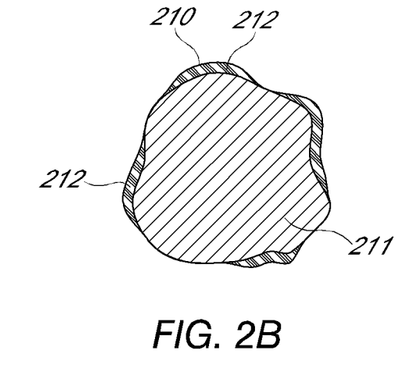

FIG. 2A shows a cross-section of one embodiment of a coated (i.e., encapsulated) particle 200. In the coated particle 200, a reactive material 201 is coated with a shell 202. The shell 202 covers substantially the entire surface area of the reactive material 201. FIG. 2B shows a cross-section of another embodiment of a coated (i.e., encapsulated) particle 210. In the coated particle 210, a reactive material 211 is coated with a shell 212. Only a portion of the surface area of the reactive material 211 is coated with the shell 212.

Self-repairing Composites

Some embodiments disclosed herein provide self-repairing composites. In some embodiments, the self-repairing composites include a binding medium and one or more of the binding medium-repairing particles disclosed herein.

Binding Medium

As described herein, binding medium, in some embodiments, refers to any material that provides sufficient adhesion between the various components (e.g., the piezoelectric material and the conductivity enhancer) in the composite. For example, the binder may sufficiently adhere the components to form a generally solid composite. In some embodiments, the binding medium, or its precursor, can allow the composite to flow until it is cured to adhere the components together into a solid. The binding medium can be, in some embodiments, configured such that the composite after curing exhibits a penetration resistance of at least 500 psi, at least 1000 psi, at least 2000 psi, at least 3000 psi, or at least 4000 psi. The penetration resistance can be readily determined according to ASTM C 403.

In some embodiments, the binding medium can include a binding polymer. For example, the binding polymer may be a thermoplastic or thermosetting polymer that can be initially a liquid before curing the material into a solid. The binding polymer can be cured by various means, such as by cross-linking an existing polymer or polymerizing monomer units (or lower molecular weight polymers). As one example, the binding medium can be an epoxy, where the precursor materials for the epoxy (e.g., bisphenol-A and epichlorohydrin) can be mixed with other components. The precursor materials can be polymerized to form the binding medium and harden the composite. As another example, the binding medium can be a photo-polymerizable polymer, such as an acrylic. Monomer units can be combined with other components in the composite and exposed to radiation to polymerize the monomers into an acrylic polymer. The acrylic forms the binding medium and adheres the components within the composite. A skill artisan can appreciate that many other possible polymers can be used as the binding medium and are within the scope of the present disclosure.

In some embodiments, the binding medium includes cement. As used herein, the term "cement" is intended to include its generally understood meaning for concrete materials (see ASTM C125-10A). The cement can be hydraulic cement or non-hydraulic cement. That is, the cement may or may not require hydrating with water in order to cure the binding medium. Portland cement, and its many related blends, is one example of cement that can be included in the composites of the present disclosure. In some embodiments, the cement is hydraulic cement.

The binding medium can also be a mixture of two or more components. For example, the binding medium can be a mixture of a binding polymer and cement (e.g., a mixture of epoxy and Portland cement). The binding medium can include, for example, at least about 20% by weight cement, at least about 30% by weight cement, at least about 50% by weight cement, at least about 70% by weight cement, at least about 80% by weight cement, at least about 90% by weight cement, or at least about 95% by weight cement. The binding medium can include, for example, at least about 10% by weight binding polymer, at least about 20% by weight binding polymer, at least about 30% by weight binding polymer, at least about 40% by weight binding polymer, at least about 50% by weight binding polymer, or at least about 80% by weight binding polymer.

The amount of binding medium in the composite is not particularly limited and will be selected based on the particular binding medium and other components in the composite. Thus, in some embodiments, the composite includes an amount of binding medium that is effective to form a solid composite (e.g., the composite does not flow under applied pressure). For example, the amount of binding medium can be an effective amount such that, after curing, the composite exhibits a penetration resistance of at least about 500 psi, at least about 1000 psi, at least about 2000 psi, at least about 3000 psi, or at least about 4000 psi.

The mass percent of the binding medium in the composite can vary. For example, the composite can contain the binding medium in a mass percent of about 1%, about 5%, about 10%, about 20%, about 30%, about 40%, about 50%, about 55%, about 60%, about 65%, about 70%, about 75%, about 80%, about 85%, about 90%, about 95%, or any range between two of these values, based on the total mass of the composite. In some embodiments, the composite has the binding medium in a mass percent of about 20% to about 50%, based on the total mass of the composite. In some embodiments, the composite contains the binding medium in a mass percent of about 30%, based on the total mass of the composite.

Composite-repairing Particles

In addition to the binding medium, the self-repairing composites disclosed herein can include one or more composite-repairing particles. The composite-repairing particle can be any of the binding medium-repairing particles disclosed herein. The particles can be dispersed within the binding medium; however, the present disclosure is not particularly limited in how the particles are dispersed within the binding medium. In some embodiments, the particles are randomly dispersed within the binding medium. In some embodiments, the particles are dispersed in a pre-determined pattern within the binding medium. Various embodiments are disclosed herein, but others will be readily apparent to the skilled artisans and are within the scope of the present disclosure.

As described above, in some embodiments, the break of the shell of the binding medium-repairing particle (e.g., the dissolution of the shell in the aqueous medium) can lead to the release of one or more components of the reactive material (e.g., the reactant) from the particle, so that the one or more components of the reactive material can interact with the binding medium to form an aggregate. Therefore, the composite-repairing particles disclosed herein, in some embodiments, can be used to repair the composite (e.g., cement, or a concrete structure) within which they are embedded. For example, when a crack is formed within or on the surface of the composite, the shell can release the encapsulated reactive material in response to the presence of the aqueous medium (e.g., seawater). The reactive material (e.g., the reactant and/or expansion agent) can then interact with the binding medium (e.g., the cement on the surface area of the crack) to form aggregate and fill up the crack. As used herein, a crack can be any opening in a concrete or concrete-related substrate, include, but is not limited to, a gap, a fissure, a split, a groove, a cleft, a break, a fracture, a rupture, a breaking, and a micro-crack. The crack can have various sizes and be in any shape. The length of the crack can vary. For example, the length of the crack is about 0.1 m, about 0.5 m, about 1 m, about 2 m, about 5 m, about 8 m, about 10 m, or about 50 m, or any range between any two of these values. In some embodiments, the length of the crack is no less than about 0.1 m, no less than about 0.5 m, no less than about 1 m, no less than about 2 m, no less than about 5 m, no less than about 8 m, no less than about 10 m, or no less than about 50 m. The width of the crack can also vary. In some embodiments, the width of the crack is no more than about 5 mm, no more than about 4 mm, no more than about 3 mm, no more than about 2 mm, no more than about 1 mm, no more than about 0.5 mm, or no more than about 0.1 mm.

The relative ratio by weight of the composite-repairing particles and the binding medium in the self-repairing composites disclosed herein can vary. For example, the relative ratio can be about 0.1:99.9, about 0.2:99.8, about 0.3:99.7, about 0.4: 99.6, about 0.5:99.5, about 1:99, about 1.5:98.5, about 2:98, about 2.5:97.5, about 3:97, about 3.5:96.5, about 4:96, about 4.5:95.5, about 5:95, about 6:94, about 7:93, about 8:92, about 9:91, about 10:90, about 15:85, about 20:80, about 25:75, about 30:70, about 40:60, or a range between any two of these values.

As would be appreciated by the skilled artisans, the composites disclosed herein can include various other components without departing from the scope of the present disclosure. For example, the composites can also include other components intended to enhance the corrosion resistance of the composites, inert materials such as expanded slag, fillers, or porous regions. Thus, the various components described herein are not intended to be exhaustive and other, non-listed components are expressly permitted.

Some embodiments of the composites disclosed herein are directed to concrete. It is therefore within the scope of the present disclosure to include various other components in the composite that are commonly included in concrete. Non-limiting example of additional components include granular materials, viscosity modifiers, corrosion inhibitors, pigments, wetting agents, water-soluble polymers, strength enhancing agents, rheology modifying agents, water repellents, fibers, permeability reducers, pumping aids, fungicidal admixtures, germicidal admixtures, insecticidal admixtures, finely divided mineral admixtures, alkali reactivity reducer, bonding admixtures, and any other admixtures or components that do not adversely affect the corrosion-resistant properties of the composite. U.S. Pat. No. 7,670,426 discloses many common components in concrete, as well as basic procedures for preparing concrete.

In addition to the binding medium, the self-repairing composites disclosed herein can include a granular material dispersed within the binding medium. The granular material is not particularly limited and can be selected based upon the desired properties of the composite. In some embodiments, the granular material is configured to carry compressive loads. The granular material can therefore be any material with sufficient compressive strength. For example, the granular material can exhibit a compressive strength of at least about 1000 psi (about 7000 kPa), at least about 2000 psi (about 14,000 kPa), at least about 3000 psi (about 21,000 kPa), at least about 5000 psi (about 34,000 kPa), or at least about 6000 psi (about 41,000 kPa). The granular material can, in some embodiments, be selected from sand, sand-rock, gravel, stone, crushed stone, iron-blast furnace slag, and combinations thereof.

Methods for Making Self-repairing Composites

Figure 3:
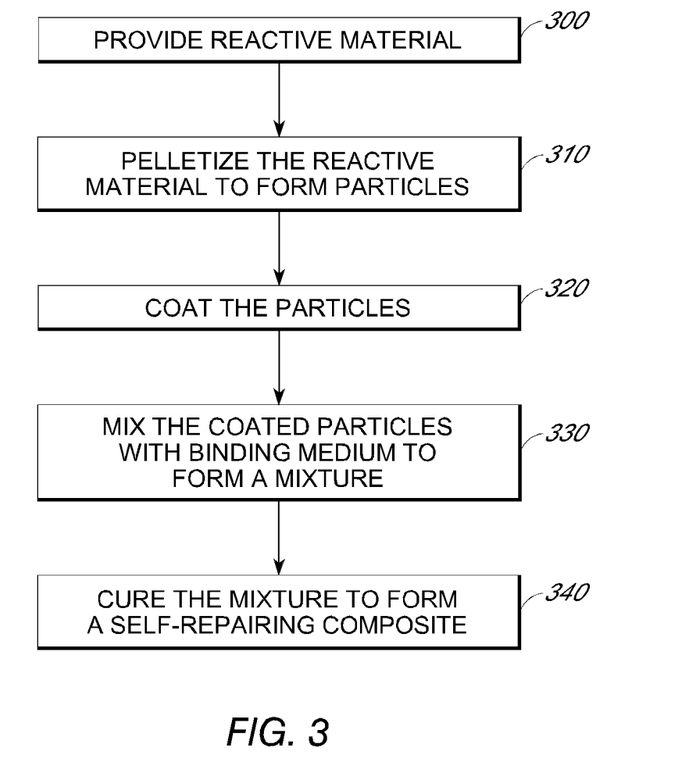
FIG. 3 depicts an illustrative embodiment of a method for making self-repairing composites within the scope of the present disclosure.

Also disclosed herein are methods for making the self-repairing composites. Some embodiments of the methods are depicted in FIG. 3, which depicts an illustrative embodiment of another method for making self-repairing composites within the scope of the present disclosure. Beginning at block 300 (Provide reactive material), a reactive material that includes a reactant is provided. As described above with regard to block 100, the reactant can be any of those discussed above with respect to the binding medium-repairing particle. The providing (block 300) can be conducted according to the general procedure described above with regard to block 100. Block 300 may be followed by block 310.

At block 310 (Pelletize the reactive material to form particles), the reactive material is pelletized to form particles. As described with regard to block 110, the pelletizing (block 310) can further include sorting the particles according to their sizes and/or sieving the particles. In some embodiments, the particles with the diameter of about 1 mm to about 5 mm are retained. In some embodiments, the particles with the diameter of about 2 mm to about 3 mm are retained. The pelletizing (block 310) can be conducted according to the general procedure described above with regard to block 110. Block 310 may be followed by block 320.

At block 320 (Coat the particles), substantially all, or only a portion (e.g., one particle), of the particles formed at block 310 are coated with a shell to form coated particles. As described above, the shell may cover substantially all of the surface area of the particle, or only a portion. The extent in which each particle is coated can also vary. The coating (block 320) can be conducted according to the general procedure described above with regard to block 120. Block 320 may be followed by block 330.

At block 330 (Mix the coated particles with binding medium to form a mixture), substantially all, or a portion (e.g., one particle) of the coated particles formed at block 320 are mixed with a binding medium to form a mixture. The binding medium can be any of those discussed above with respect to the composite. For example, the binding medium can be concrete. In some embodiments, the mixture is in the form of cement mortar. Other components can also be mixed in block 330, such as water or any other the components discussed above with respect to the composite. In some embodiments, the binding medium and/or any of the other components included in the composites can be grinded (separately or together) or sieved (separately or together) before, during or after being mixed with the coated particles to form a mixture in block 330. The components can be mixed together using, for example, a concrete mixer or a dispersion machine. In some embodiments, the components are combined to obtain a generally uniform mixture. In some embodiments, water is combined with the binding medium and the particles. The order of combining the components is not particularly limited and any order is within the scope of the present disclosure. In some embodiments, the coated particles are dispersed (e.g., randomly) within the binding medium in the mixture. Block 330 may be followed by block 340.

Block 340 (Cure the mixture to form a self-repairing composite) includes curing the mixture to form the self-repairing composite. In some embodiments, the self-repairing composite is a hardened composite. For example, curing the mixture can include maintaining the mixture under conditions sufficient for the mixture to harden (i.e., the mixture does not flow under applied pressure). The method for curing can vary depending, in part, upon the binding medium in the mixture. For example, if the binding medium includes hydraulic cement, the curing may include maintaining the mixture under moist conditions so that the mixture sufficiently hardens. This can be achieved, for example, by covering the mixture with a plastic sheet, or applying water to the mixture. Meanwhile, if the binding medium includes a polymer, curing can include exposing the mixture to radiation to initiate cross-linking or polymerization. Without being limited to any particular theory, it is believed that in the case where the curing include maintaining the mixture under moist conditions, the shell of the binding medium-repairing particle can substantially prevent the reactive material in the particle from being exposed to the moisture and/or the binding medium, so that the reactant is kept inactive.

The composites disclosed herein can be used in structures that are underwater, or may be exposed to water, for example, structures underwater or near coastal areas. Non-limiting examples of structures that can include the composites disclosed herein include bridges, dam, bridge piling, tunnels, sea walls, retaining walls, docks, breakwater, pavement, ships, barges, roads, walkways, offshore platforms (e.g., oil rigs), and the like.

EXAMPLES

Additional embodiments are disclosed in further detail in the following examples, which are not in any way intended to limit the scope of the claims.

Example 1

Preparation of Cement-repairing Particles

In this example, active silica nano-particles are used as the reactant, expansive cement is used as the expansion agent, carboxymethyl starch sodium or L-hydroxypropylcellulose is used as the disintegrant, and lactose is used as the adhesive material. The reactant, the expansion agent, and the disintegrant are mixed in a rotary container to form a mixture. The approximate relative ratio of each component by weight is:Reactant: Expansion agent:Disintegrant=85:3:6. The mixture is then transferred to another rotary disk-form container, where lactose is atomized out from an atomizer into this rotary disk-form container for pelletizing. The relative ratio between the mixture and the lactose is about 94:6. After several minute, particles are formed. The particles are then sieved and only particles with the diameter of about 2 mm to about 5 mm are retained.

The particles are then coated with a mixture of HIPMC and EC using polymer atomization technology. The film shell formed by the mixture of HIPMC and EC encapsulates the reactive material. The coated particles are dried using hot-air current technology.

Example 2

Preparation of Cement-repairing Particles

In this example, cement-repairing particles are prepared according to the general procedure described in Example 1, except that a mixture of active silica nano-particles and aluminum hydroxide nanoparticles are used as the reactant.

Example 3

Protection of a Breakwater Using Self-repairing Cement

Cement-repairing particles are prepared according to the general procedure described in Example 1. The particles are mixed with cement to form a cement mortar. The relative ratio between the particles and the cement in the cement mortar is about 1:99 by weight. The cement mortar is used to build a breakwater.

When a crack is formed in the breakwater, the water infiltrated into the breakwater can cause the shell of the cement-repairing particle to dissolve and release the reactive material to the water. Without being limited to any particular theory, it is believed that the active silica can be activated and interact with calcium hydroxide crystals on the crack surface, to form hydrated calcium silicate gels (e.g., $mCaO.nSiO_2.xH_2O$) in the presence of water. The formation of the hydrated calcium silicate aggregates with low water solubility is expected to reduce the cross-section surface of the crack, and substantially block and seal the crack in situ. The formation of the micro-crystals can be tested by X-ray diffraction and scanning electron microscopy analysis. Further, it is expected that the volume increase of expansive cement in the presence of water can enhance the blocking effect by the reactant.

Accordingly, the self-repairing cement prepared in this example can prevent infiltration of water into the crack or the interior of the breakwater and thus prevent further corrosion (e.g., the corrosion caused by chloride ions in the seawater).

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A binding medium-repairing particle, comprising:
   a reactive material comprising a reactant and an adhesive material, wherein the adhesive material is water soluble; and
   a shell configured to at least partially encapsulate the reactive material,
   wherein the reactant is selected to interact with a binding medium to form an aggregate in the presence of an aqueous medium.

2. The particle of claim 1, wherein the shell allows controlled-release of the reactive material in response to the aqueous medium.

3. The particle of claim 1, wherein the shell comprises acrylic or cellulose polymers, or any combination thereof.

4. The particle of claim 1, wherein the shell comprises a pore-forming agent.

5. The particle of claim 4, wherein the pore-forming agent is hydroxypropyl methyl cellulose (HPMC).

6. The particle of claim 1, wherein the shell comprises HPMC and ethylcellulose (EC).

7. The particle of claim 1, wherein the reactant is selected from the group consisting of active silica, zeolite, diatomite, expanded perlite, and any combination thereof.

8. The particle of claim 1, wherein the reactive material further comprises an expansion agent.

9. The particle of claim 8, wherein the expansion agent is expansive cement.

10. The particle of claim 1, wherein the reactive material further comprises a disintegrant.

11. The particle of claim 10, wherein the disintegrant is selected from the group consisting of cross-linked carboxymethyl cellulose sodium, cross-linked polyvinylpyrrolidone, carboxymethyl starch sodium, metallic aluminum powder, and any combination thereof.

12. The particle of claim 1, wherein the adhesive material is selected from the group consisting of lactose, syrup, honey, paste resin, lactose, sodium lauryl sulfate, microcrystalline cellulose, and any combination thereof.

13. The particle of claim 1, wherein the binding medium comprises cement.

14. A self-repairing composite, comprising:
a binding medium; and
a plurality of particles, wherein at least one of the plurality of particles comprises a reactive material comprising a reactant and an adhesive material, and a shell configured to at least partially encapsulate the reactive material, wherein the reactant is selected to interact with the binding medium to form an aggregate in the presence of an aqueous medium, wherein the adhesive material is water soluble.

15. The composite of claim 14, wherein the reactive material further comprises an expansion agent.

16. The composite of claim 14, wherein the reactive material further comprises a disintegrant.

17. The composite of claim 14, wherein the binding medium comprises cement.

18. The composite of claim 14, wherein the average diameter of the plurality of particles is about 1 mm to about 5 mm.

19. The composite of claim 14, further comprising a granular material dispersed within the binding medium.

20. A method for making binding medium-repairing particles, wherein the method comprises:
providing a reactive material, wherein the reactive material comprises a reactant and an adhesive material, wherein the reactant is selected to interact with a binding medium to form an aggregate in the presence of an aqueous medium, and wherein the adhesive material is water soluble;
pelletizing the reactive material to form particles; and
coating the particles with a shell to make the binding medium-repairing particles.

21. The method of claim 20, wherein the binding medium comprises cement.

22. The method of claim 20, wherein the coating comprises drying the particles.

23. The method of claim 20, wherein the particles are coated using a polymer atomization method or a fluidized-bed atomizing method.

24. A method for making a self-repairing composite, wherein the method comprises:
providing a reactive material, wherein the reactive material comprises a reactant and an adhesive material, wherein the reactant is selected to interact with a binding medium to form an aggregate in the presence of an aqueous medium, and wherein the adhesive material is water soluble:
pelletizing the reactive material to form a first plurality of particles;
coating one or more of the first plurality of particles to form a second plurality of coated particles;
mixing one or more of the second plurality of coated particles with the binding medium to form a mixture; and
curing the mixture to form the self-repairing composite.

* * * * *

UNITED STATES PATENT AND TRADEMARK OFFICE
CERTIFICATE OF CORRECTION

PATENT NO. : 9,145,336 B2  
APPLICATION NO. : 14/352613  
DATED : September 29, 2015  
INVENTOR(S) : Lv et al.

Page 1 of 1

It is certified that error appears in the above-identified patent and that said Letters Patent is hereby corrected as shown below:

On the title page item 74, under "Attorney, Agent, or Firm", in Column 2, Line 2, delete "LLp" and insert -- LLP --, therefor.

In the specification

In Column 1, Line 9, delete "§371" and insert -- § 371 --, therefor.

In Column 6, Line 11, delete "(L-HIPC)," and insert -- (L-HPC), --, therefor.

In Column 14, Line 45, delete "HIPMC" and insert -- HPMC --, therefor.

In Column 14, Line 47, delete "HIPMC" and insert -- HPMC --, therefor.

In Column 15, Lines 51-52, delete "at least one and one or more" and insert -- "at least one" and "one or more" --, therefor.

In the claims

In Column 17, Line 9, in Claim 7, delete "and any" and insert -- or any --, therefor.

In Column 17, Line 20, in Claim 11, delete "and any" and insert -- or any --, therefor.

Signed and Sealed this  
Twenty-third Day of February, 2016

Michelle K. Lee  
*Director of the United States Patent and Trademark Office*